United States Patent
Nakamura et al.

(10) Patent No.: US 6,791,709 B1
(45) Date of Patent: Sep. 14, 2004

(54) PRINTER HOST MACHINE, PRINT COMMAND GENERATION DEVICE, AND STORAGE MEDIUM HAVING A PROGRAM STORED THEREIN

(75) Inventors: Kazuo Nakamura, Nagano (JP); Ian Clarke, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 771 days.

(21) Appl. No.: 09/644,539

(22) Filed: Aug. 24, 2000

(30) Foreign Application Priority Data

Aug. 24, 1999 (JP) .......................................... P11-237639

(51) Int. Cl.⁷ .............................................. G06K 15/00
(52) U.S. Cl. ....................... 358/1.18; 358/1.9; 358/501; 358/504; 382/167
(58) Field of Search .......................... 358/1.9, 504, 518, 358/520, 501, 1.18, 450, 448, 452; 382/167, 284

(56) References Cited

U.S. PATENT DOCUMENTS 6,385,348 B1 * 5/2002 Harada ........................ 382/284
6,532,081 B1 * 3/2003 Cecchi et al. ................. 358/1.9

FOREIGN PATENT DOCUMENTS

| JP | 7-40608 | 2/1995 |
| JP | 11-321137 | 2/1999 |
| JP | 11-110170 | 4/1999 |

* cited by examiner

Primary Examiner—Twyler Lamb
(74) Attorney, Agent, or Firm—Sughrue Mion, PLLC

(57) ABSTRACT

To enable a user to accurately grasp on a print preview screen a detailed appearance to be obtained when an image is printed. A real display button provided on the print preview screen is clicked, to thereby designate a real display area. The image of the designated area is displayed as a real image at a print resolution such that one pixel of a display corresponds to one pixel of a print image.

6 Claims, 5 Drawing Sheets

PRINTER HOST MACHINE, PRINT COMMAND GENERATION DEVICE, AND STORAGE MEDIUM HAVING A PROGRAM STORED THEREIN

BACKGROUND OF THE INVENTION

1. Field of the Invention

The present invention relates to a printer host machine for displaying a print preview screen, a print command generation device for preparing an image to be displayed on the print preview screen, and a storage medium having stored therein an operation program for the printer host machine.

The present application is based on Japanese Patent Application No. Hei. 11-237639, which is incorporated herein by reference.

2. Description of the Related Art

A user usually calls up a so-called print preview screen in order to ascertain the form in which prepared print data are to be actually printed.

In order to enable indication of appearance of a page which is to be produced from print data, a print preview screen is indicated while being scaled down so as to become smaller than an image to be actually printed on paper. The user can ascertain the sizes of margins on the paper while viewing the print preview screen. In a case where the user desires to ascertain a detailed image of a portion within the print preview screen, the image can be scaled up to a maximum of 200% the original image within the print preview screen.

However, the background technique is incapable of enabling the user to view an image whose resolution is identical with that of printed matter. Accordingly, the user cannot accurately grasp a detailed image which is to be achieved through printing.

SUMMARY OF THE INVENTION

Attention is directed toward such a drawback of the background art, and the present invention is aimed at providing a printer host machine capable of accurately indicating, on a print preview screen, a detailed appearance which a page is to have when printed, a print command generation device for preparing an image to be displayed on the print preview screen, and a storage medium having stored therein an operating program for the printer host machine.

To this end, there is provided a printer host machine including a display indication section, rendering instruction input means for entering a rendering instruction, print condition setting means for receiving settings pertaining to a print condition, first rendering means for expanding the rendering instruction into a first color space image which can be printed by a printer, and print command output means which converts the first color space image into a print command and outputs the command to the printer, the machine comprising:

second rendering means for expanding the rendering instruction into a second color space image which can be displayed by the display indication section;

display means for outputting the second color space image to the display indication section;

preview display designation means for receiving an instruction for displaying a preview;

real display instruction means which receives an instruction for displaying a preview at a resolution at which the printer performs a printing operation and which is set by the print condition setting means; and print preview display control means which, in a case where the preview display designation means designates display of a preview, causes the second rendering means to expand the rendering instruction into an image and to output the image to the display means, or which, in a case where the real display instruction means receives an instruction, causes the second rendering means to expand the rendering instruction to a resolution at which the printer performs a printing operation and to output the image to the display means.

In order to accomplish the foregoing object, the present invention provides a printer command generation device including rendering instruction input means for entering a rendering instruction, print condition setting means for receiving settings pertaining to a print condition, first rendering means for expanding the rendering instruction into a first color space image which can be printed by a printer, and print command output means which converts the first color space image into a print command and outputs the command to the printer, the machine comprising:

second rendering means for expanding the rendering instruction into a second color space image which can be displayed in a display indication section, the display indication section serving as an external device;

display means for outputting the second color space image to the display indication section;

preview display designation means for receiving an instruction for displaying a preview;

real display instruction means which receives an instruction for displaying a preview at a resolution at which the printer performs a printing operation and which is set by the print condition setting means; and print preview display control means which, in a case where the preview display designation means designates display of a preview, causes the second rendering means to expand the rendering instruction into an image and output to the image to the display means, or which, in a case where the real display instruction means receives an instruction, causes the second rendering means to expand the rendering instruction at a resolution at which the printer performs a printing operation and to output the image to the display means.

Preferably, the print command generation device comprises real display area designation means by way of which a portion of the image output from the display means is designated. In a case where the real display area designation means designates an area and when the real display instruction means receives an instruction, the print preview display means causes the second rendering means to expand a portion of the rendering instruction corresponding to the designated area into an image at a resolution at which the image is to be printed by the printer and to output the expanded image to the display means.

Preferably, in a case where the real display area designation means designates an area and when the real display instruction means receives an instruction, the print preview display means causes the second rendering means to expand a portion of the rendering instruction corresponding to the designated area into an image at a resolution lower than that at which the image is to be printed by the printer and to output the expanded image to the display means, and subsequently causes the second rendering means to expand the portion of the rendering instruction into an image at a resolution at which the printer performs a printing operation.

Further, the present invention provides a storage medium having stored therein a program for causing a computer having a display connection section and a printer connection section to execute a rendering instruction input step for entering a rendering instruction;

a print condition setting step for receiving settings pertaining to a print condition;

a first rendering step for expanding the rendering instruction into a first color space image which can be printed by a printer;

a print command output step for converting the first color space image into a print command and outputting the command to the printer;

a second rendering step for expanding the rendering instruction into a second color space image which can be displayed by the display indication section;

a display step for outputting the second color space image to the display indication section;

a preview display designation step for receiving an instruction for displaying a preview;

a real display instruction step in which there is received an instruction for displaying a preview at a resolution at which the printer performs a printing operation, and which resolution is set in the print condition setting step; and a print preview display control step in which, in a case where display of a preview is designated in the preview display designation step, in the second rendering step the rendering instruction is expanded into an image, and the image is output to the image to the display means, or, in a case where an instruction is received in the real display instruction step, in the second rendering step the rendering instruction is expanded at a resolution at which the printer performs a printing operation and the image is output to the display means.

Preferably, the program causes the computer to execute a real display area designation step in which a portion of the image output from the display means is designated. In a case where an area is designated in the real display area designation means step and when an instruction is received in the real display instruction step, in the second rendering step a portion of the rendering instruction corresponding to the designated area is expanded into an image at a resolution lower than that at which the image is to be printed by the printer, the expanded image is output to the display means, and subsequently the area is expanded to an image at a resolution at which the printer performs a printing operation and the expanded image is output to the display step.

Features and advantages of the invention will be evident from the following detailed description of the preferred embodiments described in conjunction with the attached drawings.

DETAILED DESCRIPTION OF THE PREFERRED EMBODIMENTS

A printer host machine according to one embodiment of the present invention will be described hereinbelow by reference to the accompanying drawings.

Figure 1:
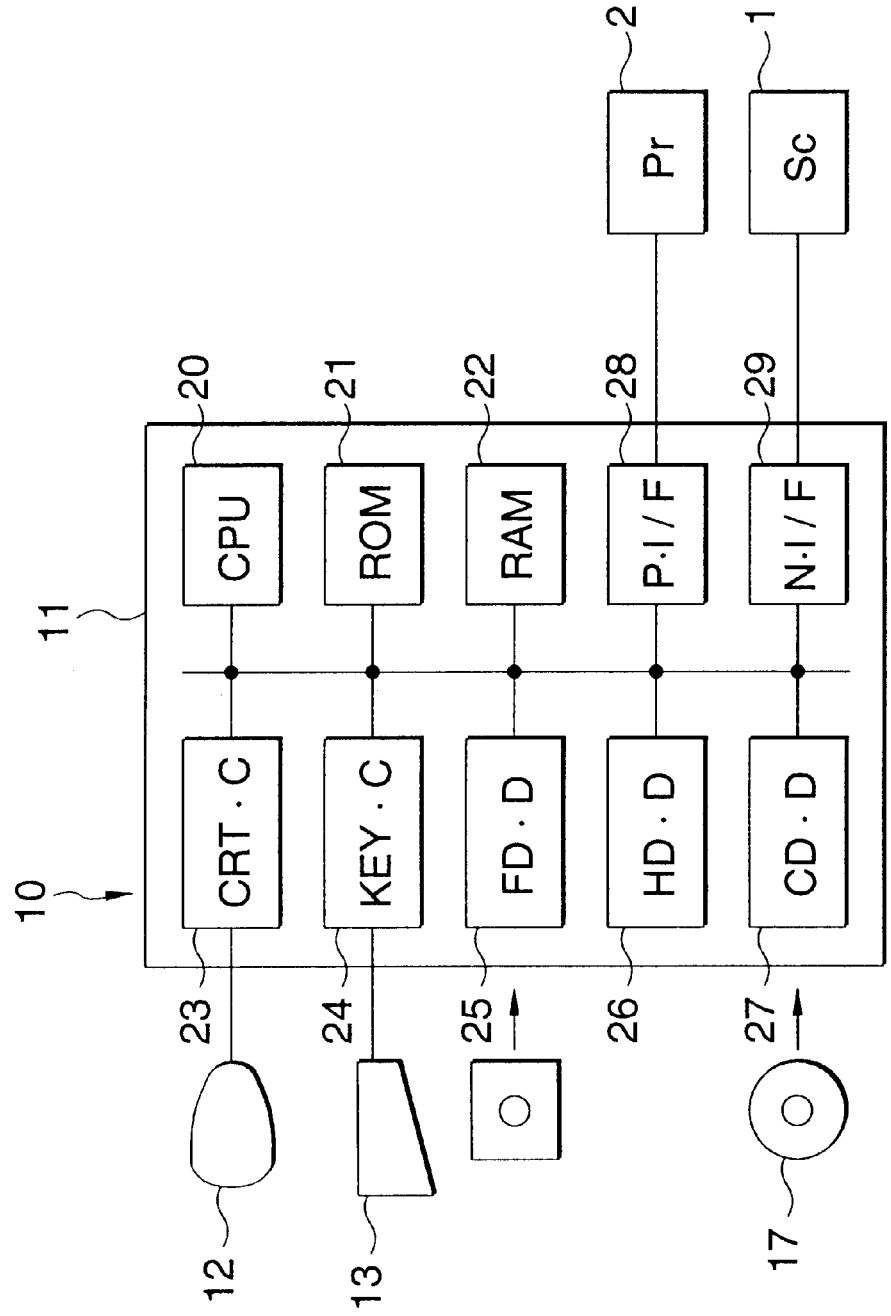
FIG. 1 is a block diagram showing the circuitry of a printer host machine according to an embodiment of the present invention.

As shown in FIG. 1, a printer host machine 10 according to the embodiment is used in combination with a scanner 1 and a printer 2, to thereby constitute a print system.

The printer host machine 10 comprises a host main unit 11, a display 12, and one or more input devices 13 such as a keyboard or a mouse. In terms of hardware configuration, the host main unit 11 comprises a CPU 20 for executing various types of programs; ROM 21 in which various types of data sets and programs are stored; RAM 22 in which various types of data sets and programs are temporarily stored; a display controller 23 for controlling the display 12; a keyboard controller 24 for controlling the input device 13; a floppy disk drive unit 25; a hard disk drive unit 26; a CD drive unit 27; a printer interface 28 to be connected to a printer; and a scanner interface 29 to be connected to a scanner or a like device.

Figure 2:
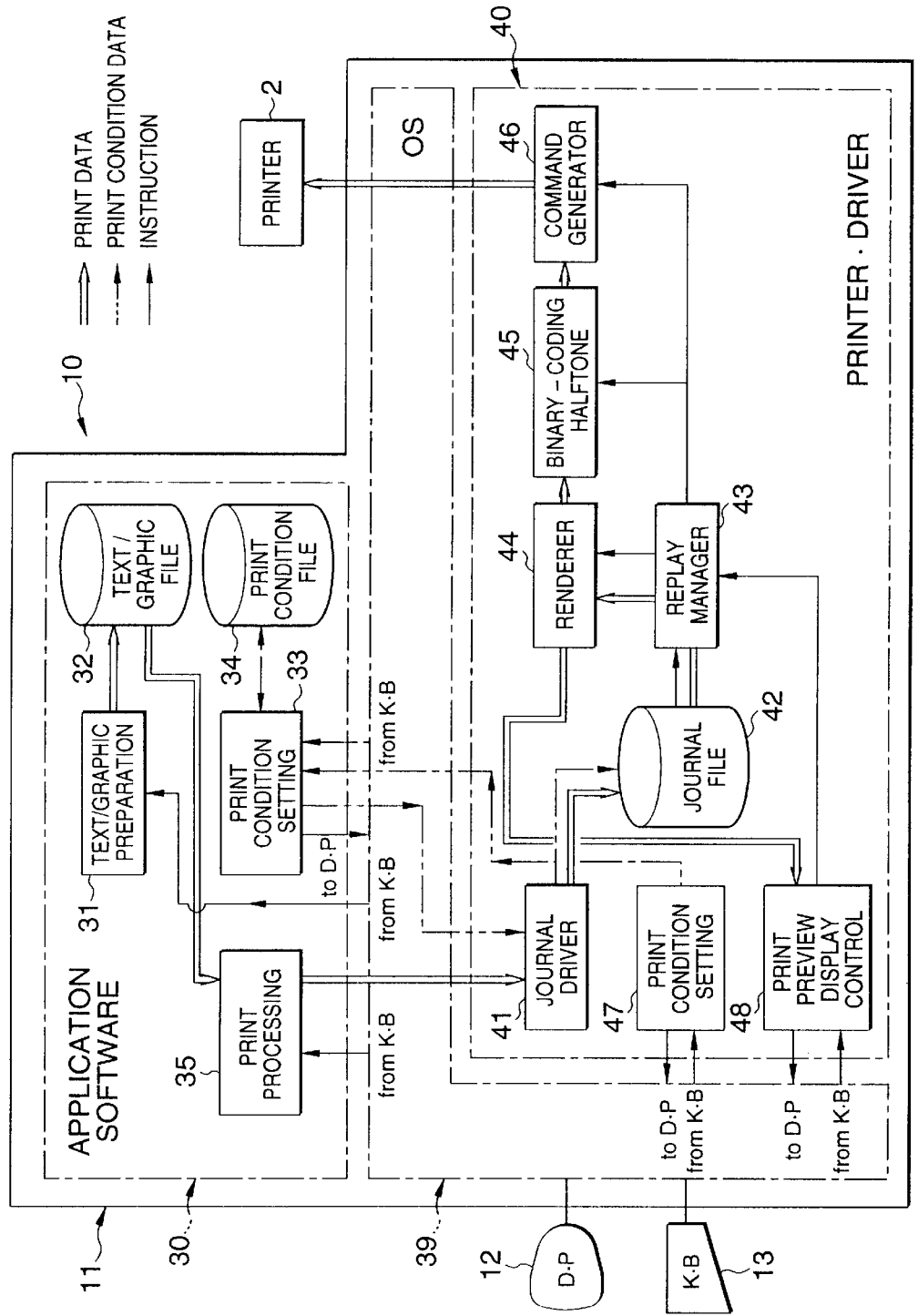
FIG. 2 is a schematic representation showing software configuration of the printer host machine according to the embodiment.

As shown in FIG. 2, in terms of software configuration, the host main unit 11 comprises application software 30; an operating system 39; and a printer driver 40. In the drawings, arrows with double lines denote flow of print data, such as text/image data, a rendering instruction, and image data; and arrows with double broken lines denote flow of print condition data. Ordinary arrows denote flow of respective types of instructions.

The application software 30 has a text/graphic preparation module 31 for preparing a text or a graphic and registering the thus-prepared text or graphic; a print condition setting module 33 for setting print conditions and registering the thus-set print conditions into a print condition file 34; and a print processing module 35 for invoking text or graphic data from the text/graphic file 32 and transmitting the thus-invoked data to the printer driver 40 as a rendering instruction. The text/graphic preparation module 31 has the function of editing an image captured by means of a scanner 1 or a prepared text or graphic, as well as the function of preparing a text or a graphic. The print condition setting module 33 has the function of causing the display 12 to indicate a print condition setting screen and receiving print conditions entered by way of the input device 13.

The printer driver 40 has a journal driver 41 which receives a rendering instruction from the print processing module 35 of the application software 30 and stores the thus-received rendering instruction into a journal file 42; a renderer 44 for converting a rendering instruction into RGB image data; a binary-coding/halftone processing module 45 which converts the RGB image data into CMYK binary-code image data by means of subjecting the RGB image data to color-conversion processing, binary-coding processing, and halftone processing; a command generator 46 for converting the CMYK binary-coded image data into a command which a printer can interpret; a replay manager 43 which calls up a rendering instruction from the journal file 42 and reproduces the rendering instruction; a print condition setting module 47 for setting print conditions; and a print preview display control module 48 for controlling display of a print preview screen.

The replay manager 43 imparts to the renderer 44 the rendering instruction called from the journal file 42, and as well manages operation of the renderer 44, that of the binary-coding/halftone processing module 45, and that of the command generator 46. The print condition setting module 47 has the function of displaying the print condition setting screen on the display 12, receiving the print condition entered by the input device 13, and storing the thus-entered print condition to the print condition file 34 by way of the print condition setting section 33 of the application software 30. The print preview display control module 48 has the function of displaying a print preview screen on the display 12 and receiving the print preview request entered by way of the input device 13.

Each of the software configuration elements set forth is implemented by means of the CD drive unit 27 reading a program stored in the CD 17 (shown in FIG. 1), loading the thus-read program into the RAM 22, and the CPU 20 executing the program.

In the present embodiment, each of rendering means, rendering management means, and print preview display control means is embodied by use of the RAM 22 having stored therein the renderer 44 (i.e., software to be executed by the rendering means); the replay manager (i.e., software to be executed by the rendering management means); and the print preview display control module (i.e., software to be executed by the print preview control means), in combination with the CPU 20 for executing these software configuration elements. Real display instruction means is embodied by means of combination of the CPU 20 for executing the print preview display control module 48, and the input device 13 by way of which the user clicks a real display button in the print preview screen that has been displayed on the display 12 as a result of execution of the print preview display control module 48. As in the case of the real display instruction means, real display region designation means is also embodied by means of combination of the CPU 20 for executing the print preview display control module 48, and the input device 13 by way of which the user designates an area of the image within the print preview screen that has been displayed on the display 12 as a result of execution of the print preview display control module 48.

Figure 3:
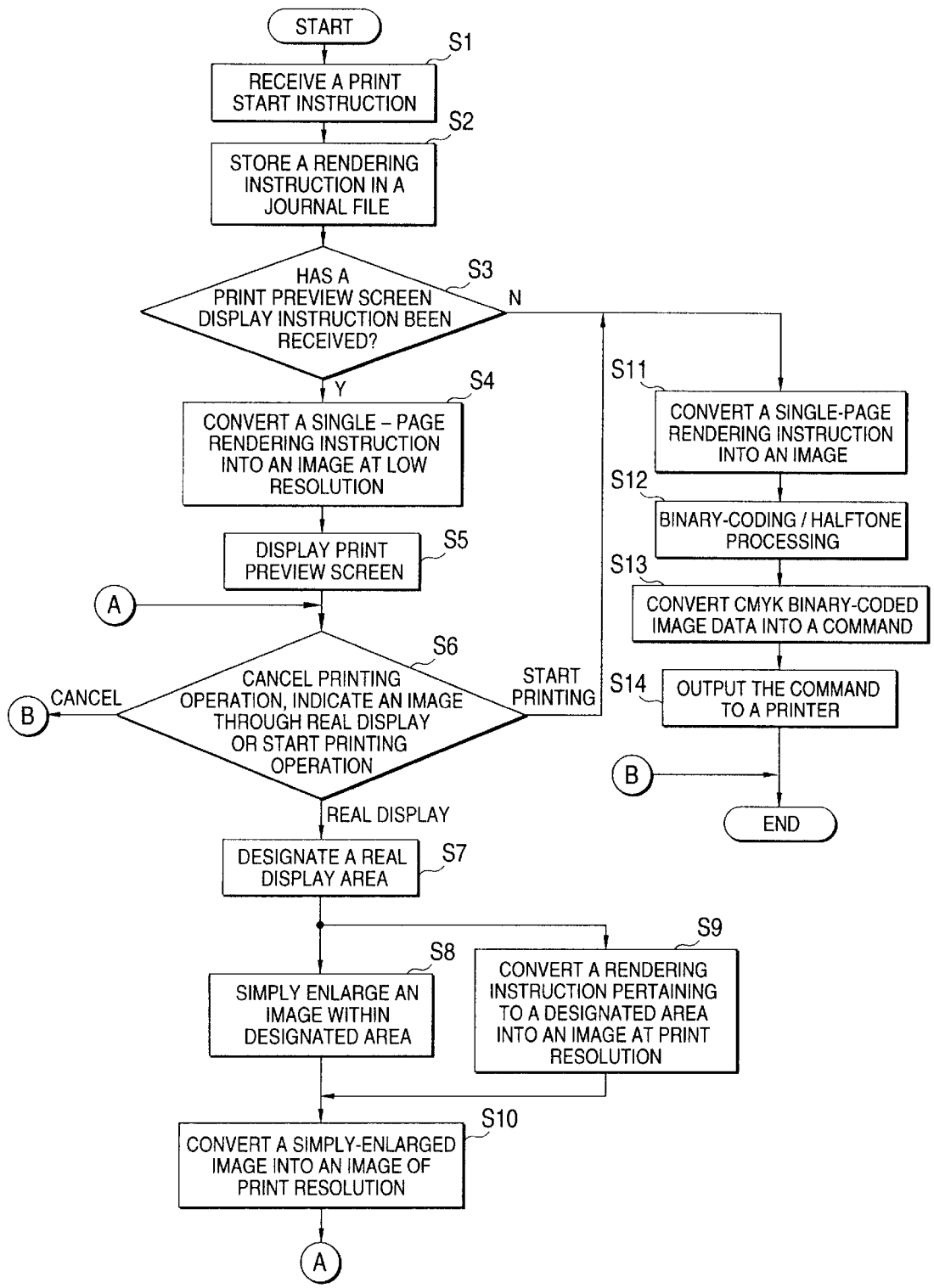
FIG. 3 is a flowchart showing the operation of the printer host machine according to the embodiment.

The operation of the printer host machine 10 according to the embodiment will now be described in accordance with the flowchart shown in FIG. 3.

The print processing module 35 of the application software 30 receives a print start instruction entered by the user by way of the input device 13 (step 1). Upon receipt of the print start instruction, the print processing module 35 transfers to the printer driver 40, as a rendering instruction, the data stored in the text/graphic file 32. The journal driver 41 of the printer driver 40 stores the rendering instruction in the journal file 42 (step 2). Normal rendering instruction processing subsequent to processing pertaining to step 11 is executed unless the print preview display control module 48 receives a display instruction with regard to the print preview screen. More specifically, the replay manager 43 calls up a rendering instruction from the journal file 42, and the renderer 44 converts the rendering instruction into RGB image data (step 11). The binary-coding halftone processing module 45 subjects the RGB image data to color conversion processing, binary-coding processing, or halftone processing, wherewith the RGB image data are converted into CMYK binary-coded image data (step 12). The command generator 46 converts the CMYK binary-coded image data into a command which the printer 2 can interpret (step 13), and outputs the command to the printer 2 (step 14).

If in step 3 the print preview display control module 48 receives a display instruction pertaining to a print preview screen, the replay manager 43 calls up a single-page rendering instruction from the journal file 42. The renderer 44 converts the rendering instruction into low-resolution RGB image data (step 4).

Figure 4:
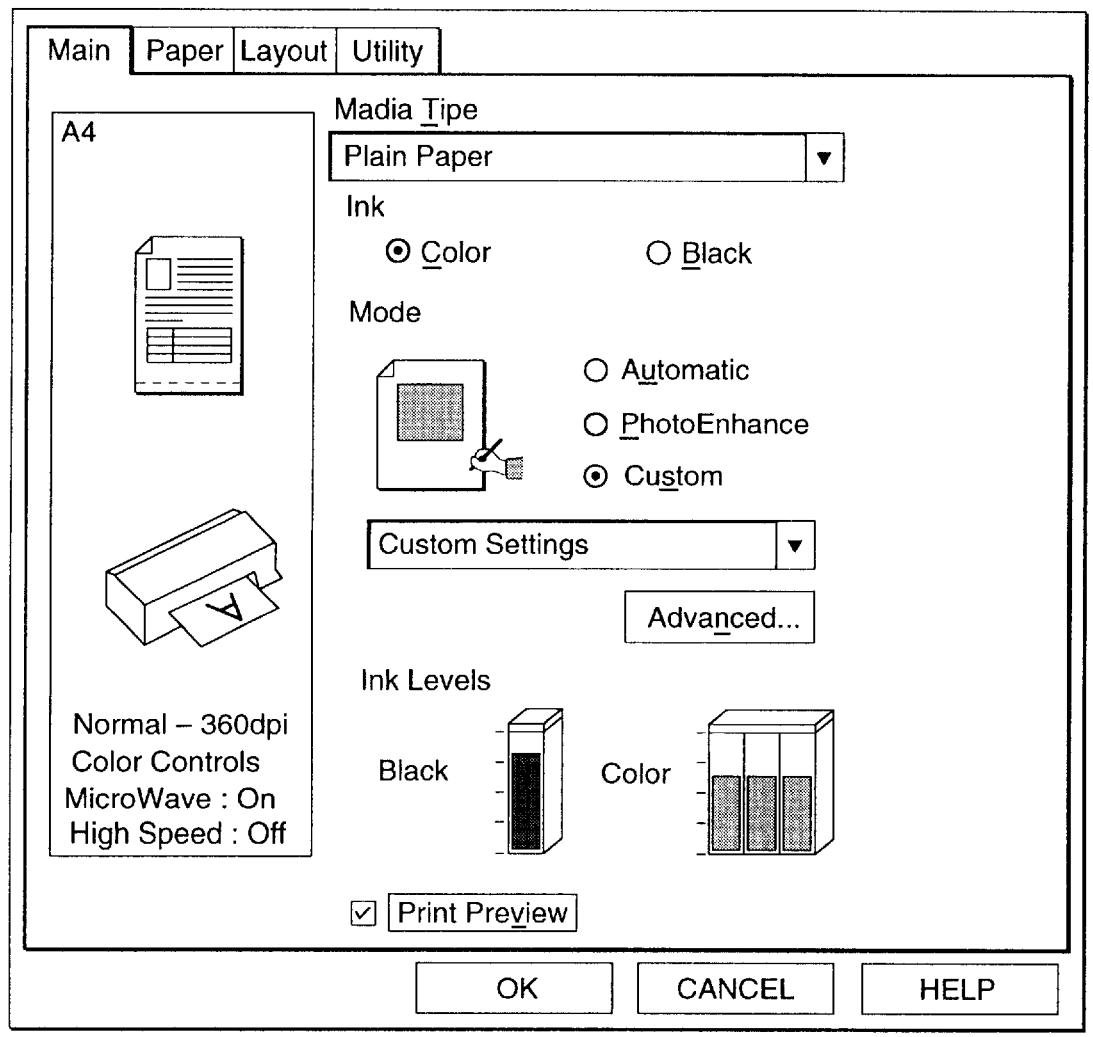
FIG. 4 is a descriptive illustration showing a print condition setting screen according to the embodiment.

As shown in FIG. 4, the display instruction with regard to the print preview screen can be executed by means of the user clicking, for example, a "Print Preview" button on the print condition setting screen through use of the input device 13. The print condition setting module 47 of the printer driver 40 indicates the print setting condition screen on the display 12. On the print condition setting screen, the user can designate the type of print medium, the type of image processing, a print resolution, and like settings, as well as the display instruction pertaining to a print preview screen. The print condition setting module 33 of the application software 30 receives a paper size and designation of a print area within the paper.

Figure 5:
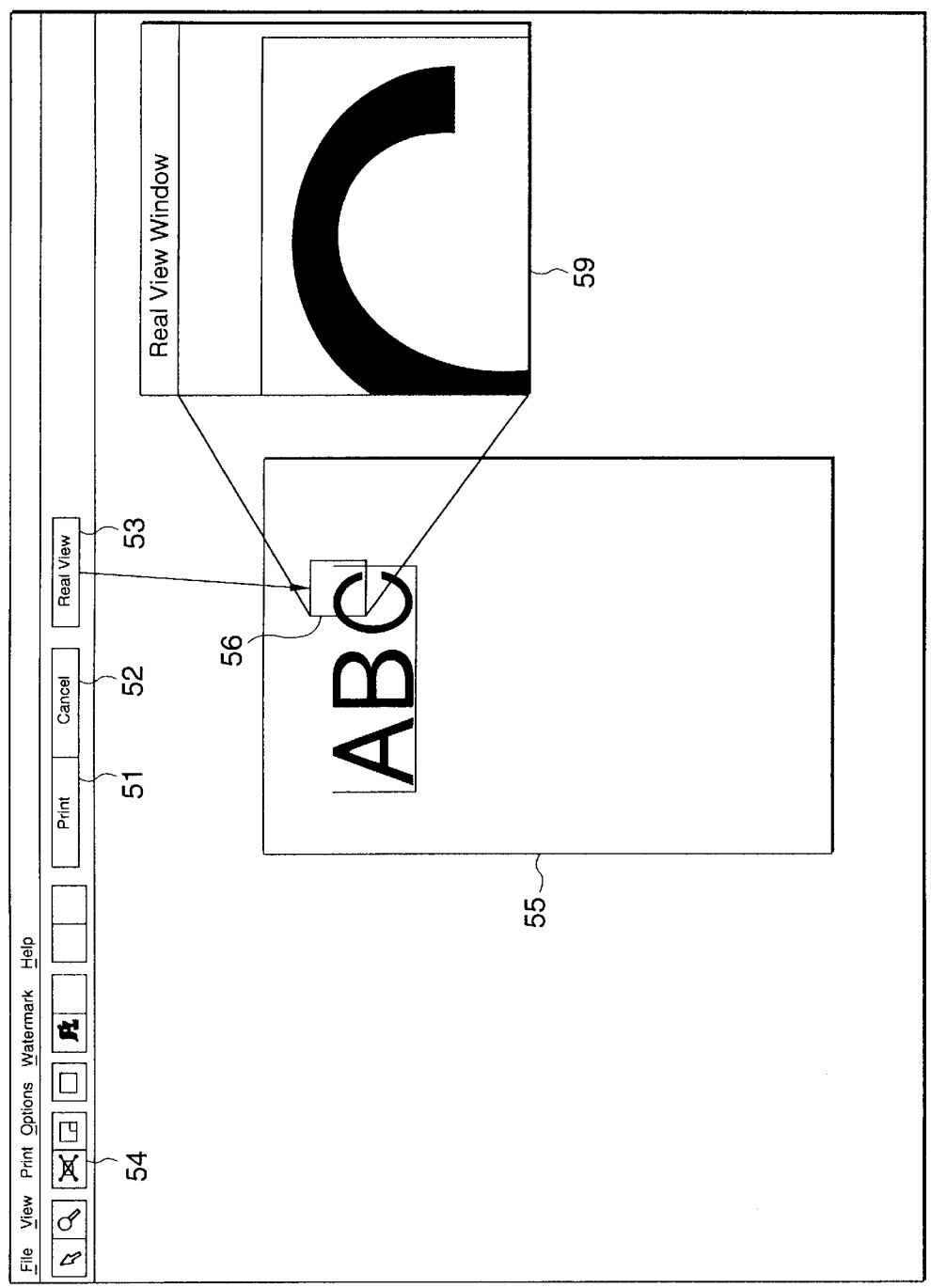
FIG. 5 is a descriptive illustration showing a print preview screen according to the embodiment.

The replay manager 43 specifies a resolution required when the renderer 44 expands the single-page rendering instruction into RGB image data. As shown in FIG. 5, the print preview screen indicates the entirety of a page of paper having the size specified by the user. Hence, the scaling factor of an image 55 corresponding to the single-page rendering instruction is determined in accordance with the paper size. More specifically, the resolution of the image 55 used for the print preview screen is in principle determined, in accordance with the paper size specified by the user.

The renderer 44 expands the single-page rendering instruction into low-resolution RGB image data (step 4), and the print preview display control module 48 indicates on the display 12 a print preview screen such as that shown in FIG. 5 (step 5). As mentioned previously, the print preview screen indicates the entire image 55 of a single page. Further, the print preview screen indicates a print start button 51, a print cancel button 52, a real display button 53, an arbitrary scaling button 54, and like buttons.

When the user clicks the print cancel button 52 by means of actuating the input device 13 (step 6), the rendering instruction stored in the journal file 42 is not printed, whereupon a round of processing operations are terminated. In a case where the user clicks the print start button 51 by means of actuating the input device 13 (step 6), processing jumps to processing immediately preceding step 11, wherewith an image corresponding to the rendering instruction stored in the journal file 42 is printed.

In a case where the user clicks the real display button 53 by means of actuating the input device 13 (step 6) and by means of actuating the input device 13 specifies an area 56 of the image 55 which the user desires to indicate through real display (step 7), the print preview control module 48 transmits the thus-specified area 56 to the replay manager 43. Further, an image pertaining to the thus-specified area 56 is simply enlarged without involvement of a change in resolution. The thus-enlarged image is displayed (step 8). The replay manager 43 calls from the journal file 42 the rendering instruction pertaining to the designated area 56, in conjunction with display of the simply-enlarged image, and causes the renderer 44 to convert the rendering instruction into RGB image data at the print resolution selected by the user (step 9).

The print condition setting module 47 of the printer driver 40 receives an instruction from the user, and the thus-received instruction is stored in the print condition file 34 of the application software 30. This instruction is used as a print resolution. The print resolution may be set to any resolution within the performance capabilities of the printer 2. For example, provided that the maximum resolution of the printer 2 assumes a value of 720 dpi, possible settings include a resolution of 360 dpi and a resolution of 720 dpi.

When the renderer 44 converts a rendering instruction pertaining to the designated area 56 into RGB image data at the selected print resolution (step 9), the print preview display control module 48 displays on the print preview screen the RGB image data in place of the simply-enlarged image such that one pixel of the display 12 corresponds to one pixel of a print image (step 10).

For instance, provided that the selected print resolution is 360 dpi and the resolution of the display 13 is 120 dpi, the image (real image) 59 of print resolution appearing on the print preview screen is displayed while being enlarged to three times the size of the image which is to be actually printed on paper, because one pixel of the display 13 is made so as to correspond to one pixel of a print image. Even a simply-enlarged image is displayed at three times the size of the image which is to be actually printed on paper. Upon completion of preparation for display of the real image, the simply-enlarged image display area is switched to a display area of the real image 59, and the real image 59 is displayed in the display area.

As mentioned above, since the user can view the image 59 on the print preview screen at the same resolution as that of a print image, the user can accurately ascertain a detailed image which will be produced upon printing. In the previous embodiment, the simply-enlarged image is displayed until the image 59 of the selected print resolution appears, thereby mitigating the effect of irritating the user, which would otherwise occur when the user awaits indication of a real image.

The present invention enables the user to view on a print preview screen an image whose resolution is the same as that of a print image. Therefore, the user can accurately ascertain a detailed appearance to be obtained when an image is printed.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A printer host machine comprising:

a display indication section;

rendering instruction input means for entering a rendering instruction;

print condition setting means for receiving settings pertaining to a print condition;

first rendering means for expanding the rendering instruction into a first color space image which can be printed by a printer;

print command output means which converts the first color space image into a print command and outputs the command to the printer;

second rendering means for expanding the rendering instruction into a second color space image which can be displayed by the display indication section;

display means for outputting the second color space image to the display indication section;

preview display designation means for receiving an instruction for displaying a preview;

real display instruction means which receives an instruction for displaying a preview at a resolution at which the printer performs a printing operation and which is set by the print condition setting means; and print preview display control means which causes the second rendering means to expand the rendering instruction into an image at a predetermined low resolution and output to the image to the display means in a case where the preview display designation means designates display of a preview, or which, in a case where the real display instruction means receives an instruction, causes the second rendering means to expand the rendering instruction to a resolution at which the printer performs a printing operation and to output the image to the display means.

2. A printer command generation device comprising:

rendering instruction input means for entering a rendering instruction;

print condition setting means for receiving settings pertaining to a print condition;

first rendering means for expanding the rendering instruction into a first color space image which can be printed by a printer;

print command output means which converts the first color space image into a print command and outputs the command to the printer;

second rendering means for expanding the rendering instruction into a second color space image which can be displayed a display indication section, the display indication section serving as an external device;

display means for outputting the second color space image to the display indication section;

preview display designation means for receiving an instruction for displaying a preview;

real display instruction means which receives an instruction for displaying a preview at a resolution at which the printer performs a printing operation and which is set by the print condition setting means; and print preview display control means which, in a case where the preview display designation means designates display of a preview, causes the second rendering means to expand the rendering instruction into an image at a predetermined low resolution and to output the image to the display means, or which, in a case where the real display instruction means receives an instruction, causes the second rendering means to expand the rendering instruction at a resolution at which the printer performs a printing operation and to output the image to the display means.

3. A print command generation device according to claim 2, further comprising:

real display area designation means by way of which a portion of the image output from the display means at said predetermined low resolution is designated, wherein, in a case where the real display area designation means designates an area and when the real display instruction means receives an instruction, the print preview display means causes the second rendering means to expand a portion of the rendering instruction corresponding to the designated area into an image at a resolution at which the image is to be printed by the printer and to output the expanded image to the display means.

4. A print command generation device according to claim 3, wherein, in a case where the real display area designation means designates an area and when the real display instruction means receives an instruction, the print preview display means causes the second rendering means to expand a portion of the rendering instruction corresponding to the designated area into an image at a resolution lower than that at which the image is to be printed by the printer and to output the expanded image to the display means, and subsequently causes the second rendering means to expand the portion of the rendering instruction into an image at a resolution at which the printer performs a printing operation.

5. A storage medium having stored therein a program for causing a computer having a display connection section and a printer connection section to execute the following steps:

a rendering instruction input step for entering a rendering instruction;

a print condition setting step for receiving settings pertaining to a print condition;

a first rendering step for expanding the rendering instruction into a first color space image which can be printed by a printer;

a print command output step for converting the first color space image into a print command and outputting the command to the printer;

a second rendering step for expanding the rendering instruction into a second color space image which can be displayed by the display indication section;

a display step for outputting the second color space image to the display indication section;

a preview display designation step for receiving an instruction for displaying a preview;

a real display instruction step in which there is received an instruction for displaying a preview at a resolution at which the printer performs a printing operation, which resolution is set in the print condition setting step; and a print preview display control step in which, in a case where display of a preview is designated in the preview display designation step, in the second rendering step the rendering instruction is expanded into an image, and the image is output to the image to the display means, or, in a case where an instruction is received in the real display instruction step, in the second rendering step the rendering instruction is expanded at a resolution at which the printer performs a printing operation and the image is output to the display step.

6. A storage device according to claim 5, wherein said program causes the computer to execute a real display area designation step in which a portion of the image output from the display means is designated, wherein, in a case where an area is designated in the real display area designation means step and when an instruction is received in the real display instruction step, in the second rendering step a portion of the rendering instruction corresponding to the designated area is expanded into an image at a resolution lower than that at which the image is to be printed by the printer, the expanded image is output to the display means, and subsequently the area is expanded to an image at a resolution at which the printer performs a printing operation and the expanded image is output to the display means.

* * * * *